United States Patent
Moebus

(10) Patent No.: US 6,761,961 B1
(45) Date of Patent: Jul. 13, 2004

(54) DEVICE AND METHOD FOR PRODUCING FLOOR PANELS

(75) Inventor: Maik Moebus, Lampertswalde (DE)

(73) Assignee: Kronospan Technical Company Limited, Nicosia (CY)

(*) Notice: Subject to any disclaimer, the term of this patent is extended or adjusted under 35 U.S.C. 154(b) by 0 days.

(21) Appl. No.: 09/856,087
(22) PCT Filed: Aug. 4, 2000
(86) PCT No.: PCT/EP00/07579
§ 371 (c)(1), (2), (4) Date: May 16, 2001
(87) PCT Pub. No.: WO01/21366
PCT Pub. Date: Mar. 29, 2001

(30) Foreign Application Priority Data

Sep. 22, 1999 (DE) .......................... 199 45 279

(51) Int. Cl.⁷ .................................................. B32B 3/30
(52) U.S. Cl. .......................... 428/167; 428/58; 428/83; 428/132; 428/192
(58) Field of Search ........................... 428/192, 60, 58, 428/364, 41.7, 41.8, 43, 44, 347, 194, 83, 132, 167

(56) References Cited

U.S. PATENT DOCUMENTS

| | | | |
|---|---|---|---|
| 3,935,330 A | | 1/1976 | Smith et al. |
| 5,830,549 A | * | 11/1998 | Sweet et al. ............... 428/40.1 |
| 5,930,967 A | * | 8/1999 | Stoehr et al. .............. 52/403.1 |
| 5,935,668 A | * | 8/1999 | Smith ........................ 428/40.1 |
| 5,985,415 A | * | 11/1999 | Giltner ....................... 428/192 |
| 6,129,871 A | * | 10/2000 | Suzuki et al. ................ 264/51 |

FOREIGN PATENT DOCUMENTS

| | | |
|---|---|---|
| CA | 1 227 961 | 10/1987 |
| DE | 197 56 129 | 7/1999 |
| EP | 0 923 995 | 6/1999 |
| GB | 2 310 855 | 9/1997 |
| WO | 87/00399 | 1/1987 |

OTHER PUBLICATIONS

XP002138786 & JP 62 148205 A (Kiyo Sangyo YG), Jul. 2, 1987, Zusammenfassung.

* cited by examiner

Primary Examiner—Merrick Dixon
(74) Attorney, Agent, or Firm—Renner, Otto, Boisselle & Sklar, LLP

(57) ABSTRACT

The invention relates to a compression device for compressing a stratified material for producing panels, in particular for a floor, comprising two heated plates, gripping and transport elements, with which a 5 to 12 mm thick stratified material for producing floor panels is gripped and transported between the plates of the compression device. Said device also comprises displacement elements which convey the heated plates to the stratified material in order to compress the latter, whereby the position of the heated of the gripping elements is chosen in such a way that the gripping elements are located next to the press plates. The displacement elements are controlled in such a way that both heated plates reach the stratified material simultaneously and are withdrawn from said stratified material in the same manner. The device enables particularly wide, high-quality panels to be produced.

9 Claims, 2 Drawing Sheets

DEVICE AND METHOD FOR PRODUCING FLOOR PANELS

The invention relates to a device and a method for pressing a layer system for the production of panels. The invention also relates to panels produced in accordance with the method.

BACKGROUND

A panel, known from the publication EP 090 6994 A1, for example, is an elongated, thin plate which can be joined laterally to other panels, for instance by way of tongues and grooves. Panels joined together in this way are used in particular as a floor covering.

Panels are produced according to the prior art by means of a short-cycle pressing process as follows. A base plate is laid on top of a film-like layer impregnated with resin which is called "counteracting paper". Another film-like layer impregnated with resin and provided with a pattern is laid on top of this. A layer of this kind is known by the name of "decorative paper". A next film-like layer containing corundum and resin is applied to the decorative layer. This layer is known by the name of "overlay". The overlay enables the desired hardness of the surface of a panel to be obtained. The aforementioned layer system is gripped together at the edge with gripping means and conveyed into a press. The press essentially consists of two plates arranged parallel to one another which are heated to about 200° C. The layer system is laid on top of the lower of the two plates. The upper plate is then lowered so that the layer system is compressed. The resins melt as a result of the heat supplied via the plates. The upper plate is then raised. Grippers with suction cups are moved over the compressed layer system and lowered. The suction cups are placed on the layer system and become firmly attached by suction. With the aid of the firmly attached suction cups the layer system is lifted and conveyed out of the press. Panels are cut from this layer system using appropriate devices, the panels usually being about 1200 to 1300 mm long, five to twelve millimetres thick and about 200 mm wide. Finally, the panels generally also have tongues and grooves as a consequence of a milling operation. Panels are joined together via tongue and groove. They then form floor coverings or wall claddings.

The joined panels are fitted together, for instance to form a floor covering which is known by the name of laminated flooring.

A drawback of a flooring of this kind is that it has a relatively large number of joints or seams between the panels. On the one hand, these joints are undesirable for aesthetic reasons. On the other hand, over the course of time gaps or cracks are left or form via which moisture and dirt may penetrate. Moisture damages the panels. Dirt spoils the appearance and also makes them unhygienic.

The number of joints could be considerably reduced if the panels were to have a greater width substantially above 200 mm. For production reasons, however, it is not possible at the present time to produce panels which have the required quality.

The problem in production is the supply of heat at different times. When the layer system specified in the introduction is laid on top of the lower hot pressing plate, heat is supplied from beneath and the contiguous resin melts. During this time the resin on the upper surface remains solid. Also, after the pressing operation the supply of heat from above is discontinued sooner as the layer system is still for the time being resting on the lower plate. The resin in the upper regions of the panel accordingly hardens more rapidly. Overall, these differences result in slight bulges which the layer system shows after leaving the press.

The aforementioned bulges are particularly clearly visible in the flooring if the panel is particularly wide. To avoid this undesired visual effect, panels are usually made appropriately narrow.

SUMMARY OF THE INVENTION

The object underlying the invention is to avoid the number of joins in a flooring composed of panels.

The object is achieved with the aid of a device with the features of the first claim. A method for achieving the object comprises the features of the independent claim. The product produced according to the method comprises the features of the claim directed at the panel.

The device comprises gripping means to grip a layer system of the type specified in the introduction and convey it between two plates of a press. The presses are brought to operating temperature via heating means. Moving means are also provided to move the two plates into contact with the layer system at the same time and to press it. The position of the pressing plates relative to the position of the gripping means is selected so that the gripping means cannot get between the pressing plates. After sufficiently long pressing, the pressing plates are moved simultaneously away from the layer system. The now pressed layer system is then processed further in the known manner.

In the device according to the invention the heat is supplied at the same time. Melting or hardening of the resins at different times does not apply. The corresponding deformations are thereby avoided. It is thus possible to produce panels of very good quality which are considerably wider than conventional panels.

The dimensions of the panels which can now be produced with the required quality are in the order of above 300 mm in width. Dimensions above 600 mm still have the desired quality. However, these widths can no longer be sufficiently easily handled with the conventional lengths of up to 2000 mm. Dimensions above 600 mm are therefore no longer sensible if the average consumer represents the target group. Dimensions of 380 to 400 mm are advisable as this corresponds to double the width of conventional panels.

The problem of the bulges described in the introduction solely concerns thin panels. By these are meant in particular panels which are up to 12 mm thick. The thicker the panels are, the less the surfaces distort during production in which the heat supply from one side starts a few seconds earlier than the supply from the other side. Panels which are thinner than 5 mm are too fragile. A thickness of at least 5 mm should therefore expediently be observed as the lower limit.

The temperature applied to the top side of the layer system during the pressing may differ from the temperature applied from the underside. This is generally the case when different resins with different melting points are used. The particular operating temperature which is applied from below or above should be adapted to the particular melting point. Temperature differences of at least 10% are regularly necessary in order to maintain the desired good result. Temperature differences above 10° C. are typical, particularly above 20° C. Optimum temperatures may be obtained in each individual case by means of a few trials.

Of course it is not absolutely necessary for the production of the wide panels that the panels according to the invention have the specified design features. The essential point is that the conventional two-sided heat supply is not performed with a time lag of a few seconds. This applies both to the beginning and to the end of the supply. Melting or re-solidifying of the resins at different times is thus avoided. Moreover, in many cases it is necessary to intend different temperatures for the upper side and under side of a panel when pressing. Bulges caused by production are considerably reduced.

The temperatures during the combined supply of heat and pressure are generally between 150 and 220° C. The temperature prevailing on the upper side may differ from the temperature prevailing on the underside by 20° C., for example.

When panels are laid on a floor, any unevenness of the floor is transferred to the flooring composed of the panels. Unevenness of this kind may occur as a result of grains of sand or small stones which have undesirably got between the floor and the panels laid on top. In such cases, the joints, i.e. the joins between the panels, are subjected to strong tensile forces. The wider a panel is, the stronger such tensile forces are due to leverage forces. Panels manufactured according to the invention having a width of more than 300 mm must therefore be joined together in a particularly stable manner to cope with the aforementioned tensile forces.

In a development of the invention, the panels having a width of at least 300 mm—more particularly at least 380 mm—therefore feature double tongues and grooves by which two panels become or are joined together laterally. Such double tongues and grooves according to the claim meaning that the edges of a panel each have a groove and a tongue arranged one above the other—are certainly known from the publication EP 090 699 4 but not in combination with panels which have a width of more than 300 mm.

Alternatively or additionally panels produced according to the process include further locking elements which lock the panels together without glue. Such additional locking elements for joining without glue are in fact known, for example, from the publications EP 0 877 130 A2, EP 0 855 482 B1, U.S. Pat. No. 5,295,341 or U.S. Pat. No. 4,426,820. However, practice has shown that it is hardly possible with known production technology to produce precisely enough in order to avoid, for example, play delta in the sense of publication EP 0 855 482 B1. Only the curve-free production in accordance with the invention makes precise production possible so that two panels can be reliably, play-free and precisely joined together.

BRIEF DESCRIPTION OF THE DRAWINGS

The invention is described in more detail with the aid of the two figures, wherein.

DETAILED DESCRIPTION

Figure 1:
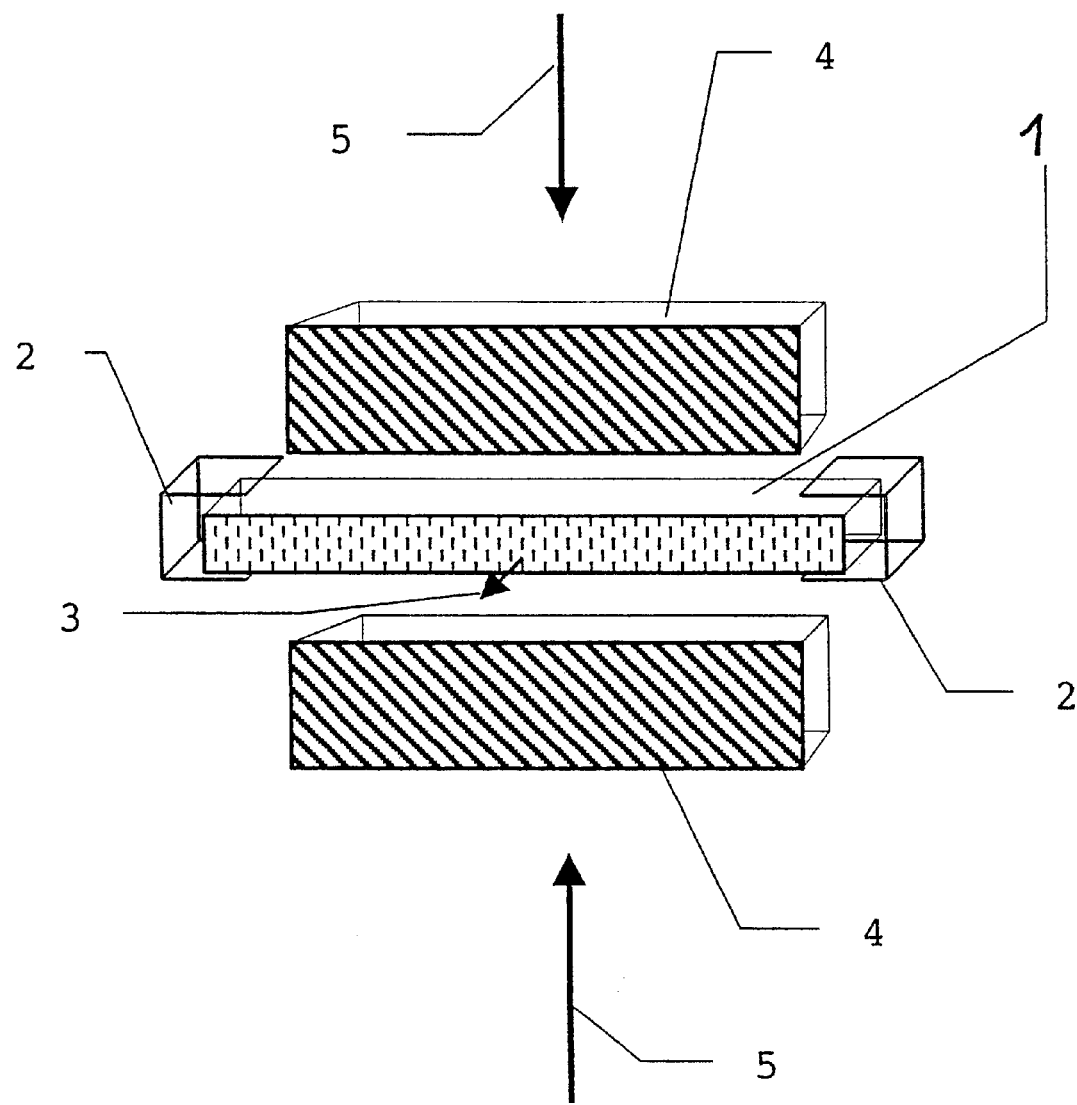
FIG. 1 is a schematic illustration of a pressing device according to the invention.

Outlined in FIG. 1 is a device for pressing a layer system to produce panels for a flooring. A layer system 1 comprises a base plate and films, paper webs or the like arranged above and beneath the said base plate which are impregnated with resins. With the aid of moving and gripping means 2 the layer system is brought between two plates 4 of a pressing device—as indicated by the arrow 3. In this position the gripping means 2 are located laterally adjacent to the pressing plates 4. The gripping means are thus arranged so that they cannot get between the pressing plates 4 during the pressing operation. The plates 4 are brought to a temperature close to 200° C. by means of heating elements which are not represented. Each exact temperature is adjusted to the melting point of each of the resins to be melted.

When the layer system 1 is located between the plates 4, the plates 4 are moved in the direction of the arrows 5, i.e. in the direction of the layer system 1. The movement of the plates 4 is effected such that they come into contact with the layer system 1 at the same time and press it. As a consequence the layer system is simultaneously acted upon from above and below (both sides) with temperature and pressure. The resins on both sides of the base plates melt simultaneously and not with a time lag of a few seconds as in the prior art mentioned in the introduction.

When the layer system has been sufficiently pressed, the plates 4 are moved away from the layer system at the same time, i.e. in the opposite direction to the direction of the arrows 5. As a consequence the temperature supply is stopped simultaneously. The resins, i.e. the adhesives, solidify simultaneously.

By means of the method illustrated with the aid of FIG. 1 or by means of the pressing device, a particularly flat pressed layer system is produced which is cut in the known manner into panels having a width of at least 300 mm and a length of at least 800 mm. Finally, tongues and grooves or comparable elements for joining panels to form a floor covering are milled.

Figure 2:
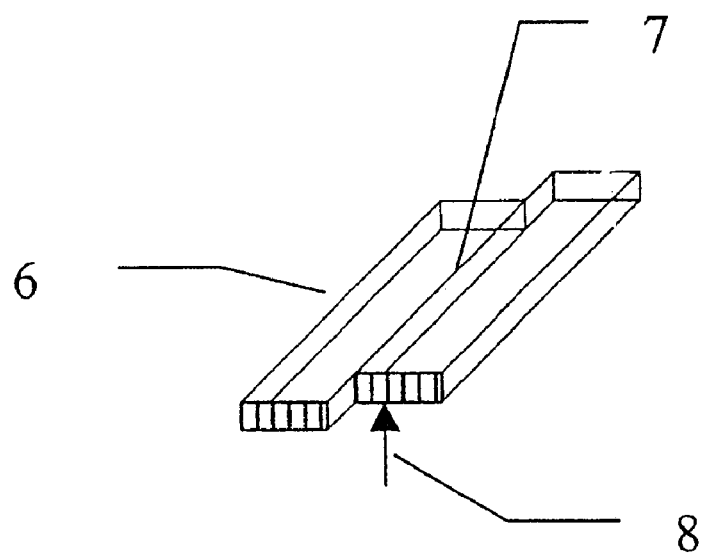
FIG. 2 is a schematic illustration of two panels made in accordance with the invention.

Shown in FIG. 2 are two panels 6, joined together laterally, between which there is a join 7. In general, this joint is produced by way of tongues and grooves (not represented) which have been appropriately milled on the side of the panels. Advantageously, double tongues and grooves are provided on the edges. A tongue of one panel is inserted into a corresponding groove of an adjacent panel together with glue. When the glue has dried two panels are joined together.

If a force is exerted from beneath in the direction of the arrow 8 due to unevenness, the join 7 is subjected to a strong mechanical load. The load depends on the leverage. The wider the panel, the greater is the leverage. By providing the double tongues and grooves, particularly stable joints capable of taking load are created.

As an additional locking element, by which two panels can be joined without glue, at least one groove is intended on the underside of a panel and at least one tongue is intended for a further panel. The tongue is intended in such a way that it can be locked into the groove on the underside of two joined together panels.

What is claimed is:

1. A panel produced by a method comprising the steps of:
   (a) forming a layer system including an adhesive that when heated and subsequently cooled effects gluing of the layers together;
   (b) positioning the layer system between heated pressing plates of a pressing device;
   (c) simultaneously moving the heated pressing plates into contact with respective opposite surfaces of the layer system;
   (d) holding the heated pressing plates under pressure in contact with the opposite surfaces of the layer system to heat the adhesive;
   (e) simultaneously moving the heated pressing plates away from the opposite surfaces of the layer system; and (f) removing the then pressed layer system from between the heated pressing plates; and wherein the panel is at least 300 mm wide, at least 800 mm long, and no thicker than 15 mm, and the panel has a groove extending along one edge thereof a tongue extending along an opposite edge thereof.

2. A panel as set forth in claim 1, wherein during step (d) the heated pressing plates press against the layer system over an area of at least 1 square meter in size.

3. A panel as set forth in claim 1, wherein the adhesive is a meltable adhesive that is melted when the layer system is held between the heated pressing plates.

4. A panel as set forth in claim 1, wherein the panel has along at least one edge thereof a tongue and a groove, and the tongue and groove are disposed above the other.

5. A panel as set forth in claim 4, wherein the groove and tongue are conical in cross-section.

6. A panel as set forth in claim 4, wherein the groove and tongue are wedge-shaped.

7. A panel as set forth in claim 1, wherein the panel has a pair of grooves extending along one edge thereof and a pair of tongues extending along an opposite edge thereof, and the grooves and tongues of the respective pairs are disposed one above the other.

8. A panel as set forth in claim 1, wherein the panel has corresponding matable locking elements extending along respective opposite edges thereof.

9. A panel as set forth in claim 8, wherein the corresponding matable locking elements can be locked together without glue with the mating locking element of an adjacent like panel.

* * * * *